United States Patent [19]

Tsukabe et al.

[11] Patent Number: 5,176,858
[45] Date of Patent: Jan. 5, 1993

[54] METHOD AND APPARATUS FOR CONTROLLING MOLDING MACHINE

[75] Inventors: Tomoyuki Tsukabe, Kyoto; Kaneo Nitta, Nagaokakyo, both of Japan

[73] Assignee: Omron Corporation, Kyoto, Japan

[21] Appl. No.: 741,355

[22] Filed: Aug. 7, 1991

[30] Foreign Application Priority Data

Aug. 16, 1990 [JP] Japan .................................. 2-216628

[51] Int. Cl.⁵ .............................................. B29C 45/76
[52] U.S. Cl. .................................. 264/40.1; 264/40.5; 264/40.6; 425/135; 425/140; 425/143; 425/149; 395/900; 364/476
[58] Field of Search ..................... 264/40.1, 40.3, 40.4, 264/40.5, 40.6, 328.1, 319; 425/135, 140, 141, 143, 144, 145, 149, 161, 162, 169, 170, 173, 542; 395/900; 364/476

[56] References Cited

U.S. PATENT DOCUMENTS

| | | | |
|---|---|---|---|
| 3,982,440 | 9/1976 | Groleau et al. | 264/40.1 |
| 4,816,197 | 3/1989 | Nunn | 264/40.6 |
| 5,012,430 | 4/1991 | Sakurai | 395/900 |

FOREIGN PATENT DOCUMENTS

| | | |
|---|---|---|
| 0276326 | 7/1987 | European Pat. Off. . |
| 3827285 | 2/1989 | Fed. Rep. of Germany . |
| 64-24719 | 1/1989 | Japan . |
| 3-224 | 1/1991 | Japan . |

OTHER PUBLICATIONS

Currie, Robert, Modern Plastics, "Here's the First Computer-Controlled Injection Machine", Oct. 1968, pp. 122-124, 126.

Maiers and Sherif, IEEE Transactions On Systems, vol. SMC-15, No. 1, "Applications of Fuzzy Set Theory", Jan./Feb. 1985, pp. 175-189.

McCusker Tom, Control Engineering, "Neural Networks and Fuzzy Logic, Tools of Promise for Controls", May 1990, pp. 84, 85.

Patent Abstracts of Japan, vol. 14, No. 420, Sept. 11, 1990, M-1023 (4363).

Patent Abstracts of Japan, vol. 15, No. 101, Mar. 11, 1991, M-1091 (4629).

Patent Abstracts of Japan, vol. 13, No. 405, Sep. 7, 1989, M-868 (3753).

"Automatisierte Maschineneinstellung beim SpritzgieBen-Wunschtraum oder Realitat?", G. Menges et al., Forschung und Entwicklung, Munchen, 1988.

*Primary Examiner*—Jill L. Heitbrink
*Attorney, Agent, or Firm*—Dickstein, Shapiro & Morin

[57] ABSTRACT

A burr amount and a shrinkage cavity amount which have been inputted with respect to a molded article by a molding machine are received. A membership function relating to the burr amount, a membership function relating to the shrinkage cavity amount, a membership function of a value relating to a molding temperature, a membership function of a value relating to a molding pressure, and rules using the burr amount and the shrinkage cavity amount as input variables and also using a value relating to the molding temperature and a value relating to the molding pressure as output variables have been preset in a fuzzy inference apparatus. By applying the burr amount and the shrinkage cavity amount which have been inputted to the rules, a fuzzy inference is executed. The value relating to the molding temperature and the value relating to the molding pressure are inferred and the results of the inferences are given to the molding machine.

6 Claims, 3 Drawing Sheets

Fig.3

If  B = PL, H = ZR   then   t = NM, p = NL

If  B = PM, H = ZR   then   t = NS, p = NM

If  B = PS, H = ZR   then   t = NS, p = NS

If  B = ZR, H = PL   then   t = NM, p = PL

If  B = ZR, H = PM   then   t = NS, p = PM

If  B = ZR, H = PS   then   t = NS, p = PS

METHOD AND APPARATUS FOR CONTROLLING MOLDING MACHINE

BACKGROUND OF THE INVENTION

1. Field of the Invention

The present invention relates to method and apparatus for controlling a molding or forming machine.

2. Description of the Related Background Art

Hitherto, a molding machine has properly been adjusted by an operator. That is, when a molded article has a large burr (fin or flash) or a shrinkage cavity, the operator who has found out such a burr or a shrinkage cavity adjusts a molding temperature, a molding pressure, or the like of the molding machine on the basis of the experience and perception of a long time.

When the molding machine is adjusted by a judgment of the operator, however, there is a problem such that the proper adjustment can be executed by the operator so long as he is always a skilled person.

SUMMARY OF THE INVENTION

It is an object of the invention to provide method and apparatus for controlling a molding machine, in which the molding machine can be automatically adjusted in a manner similar to a method which is performed by a skilled person.

An apparatus for controlling a molding machine according to the invention comprises: means for inputting a burr amount and a shrinkage cavity amount of a molded article; an a fuzzy inference apparatus which is constructed in a manner such that a membership function relating to the burr amount, a membership function relating to the shrinkage cavity amount, a membership function of a value relating to a molding temperature, a membership function of a value relating to a molding pressure, and rules using the burr amount and the shrinkage cavity amount as input variables and also using the value relating to the molding temperature and the value relating to the molding pressure as output variables are used, the burr amount and the shrinkage cavity amount which have been inputted by the inputting means are applied to the rules to thereby execute a fuzzy inference, and the value relating to the molding temperature and the value relating to the molding pressure are generated and given to the molding machine.

A control apparatus of a molding machine according to the invention comprises: means for inputting a burr amount and a shrinkage cavity amount of a molded article; and a fuzzy inference apparatus which is constructed in a manner such that a membership function relating to the burr amount, a membership function relating to the shrinkage cavity amount, and at least one of a membership function of a value relating to a molding temperature and a membership function of a value relating to a molding pressure, and rules using the burr amount and the shrinkage cavity amount as input variables and also using at least either one of the value relating to the molding temperature and the value relating to the molding pressure as an output variable are used, the burr amount and the shrinkage cavity amount which have been inputted by the inputting means are applied to the rules to thereby execute a fuzzy inference, and at least either one of the value relating to the molding temperature and the value relating to the molding pressure is generated and given to the molding machine.

A method of controlling a molding machine according to the invention comprises the steps of: receiving a burr amount and a shrinkage cavity amount of a molded article which have been inputted; using a membership function relating to the burr amount, a membership function relating to the shrinkage cavity amount, a membership function of a value relating to a molding temperature, a membership function of a value relating to a molding pressure, and rules using the burr amount and the shrinkage cavity amount as input variables and also using the value relating to the molding temperature and the value relating to the molding pressure as output variables; applying the burr amount and the shrinkage cavity amount which have been inputted to the rule to thereby execute a fuzzy inference; and generating the value relating to the molding temperature and the value relating to the molding pressure and giving to the molding machine.

According to an embodiment of the invention, the above inputting means comprises a first sensor to detect a burr amount of a molded article and a second sensor to detect a shrinkage cavity amount of the molded article.

According to another embodiment of the invention, the inputting means is an inputting apparatus for inputting a value regarding a burr amount and a value regarding a shrinkage cavity amount by being operated by an operator.

According to the invention, since a burr amount and a shrinkage cavity amount of a molded article are automatically detected or the operator inputs a burr amount and a shrinkage cavity amount by observing a molded article, a value indicative of a molding temperature and a value indicative of a molding pressure which are used to control a molding machine are automatically inferred in accordance with preset membership functions and fuzzy inference rules. By giving those values to the molding machine, control parameters of the molding machine are adjusted so as to obtain a more preferable molded article. By presetting only membership functions and fuzzy rules corresponding to the experience and perception of the skilled person, even an ordinary person can easily execute a suitable molding adjustment.

BRIEF DESCRIPTION OF THE DRAWINGS

FIG. 3 shows an example of fuzzy rules which are used in the fuzzy inference apparatus.

DETAILED DESCRIPTION OF A PREFERRED EMBODIMENT

Figure 1:
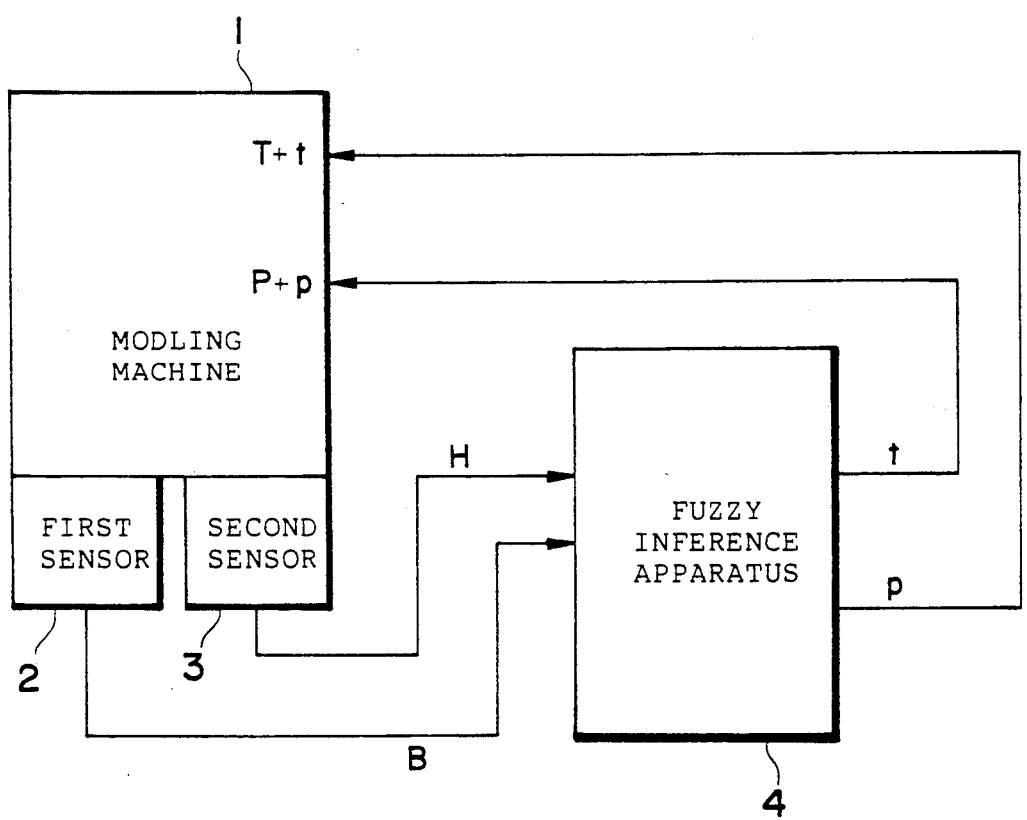
FIG. 1 is a block diagram showing an embodiment of a control apparatus of a molding machine according to the invention.

FIG. 1 is a block diagram showing a construction of a control apparatus of a molding machine according to an embodiment of the invention.

A first sensor 2 to optically detect a burr amount B of a molded article and a second sensor 3 to detect a shrinkage cavity amount H thereof are arranged near a discharging section of the molded article of a molding machine 1 as an object to be controlled. The burr amount B and the shrinkage cavity amount H which have been detected are given to a fuzzy inference apparatus 4. Membership functions and fuzzy inference rules, which will be explained hereinlater, have been preset in the fuzzy inference apparatus 4. By applying the burr amount B and the shrinkage cavity amount H which are supplied from the sensors 2 and 3 to the fuzzy inference rules, the fuzzy inference apparatus 4 executes a fuzzy inference and obtains molding temperature change amount data t and molding pressure change amount data p and sends them to the molding machine 1.

An initial molding temperature T and an initial molding pressure P have previously been given to the molding machine 1. A molded article is formed on the basis of the temperature T and the pressure P. After the molded article was ejected out of the molding machine 1, the burr amount B and the shrinkage cavity amount H of the molded article are detected by the sensors 2 and 3. By inputting the detected burr amount B and shrinkage cavity amount H, the fuzzy inference apparatus 4 infers correction temperature data t for the present molding temperature T and correction pressure data p for the present molding pressure P, respectively. Since the correction data t and p are given to the molding machine 1, the molding temperature and the molding pressure in the molding machine 1 are adjusted by (T+t) and (P+p), respectively. The detections of the burr amount B and the shrinkage cavity amount H, the fuzzy inference processes, and the adjustments of the molding temperature T and the molding pressure P are repeated as necessary. Thus, the molding of a molded article without a burr and a shrinkage cavity is realized.

The construction and operation of the fuzzy inference apparatus 4 will now be described.

Figure 2A:
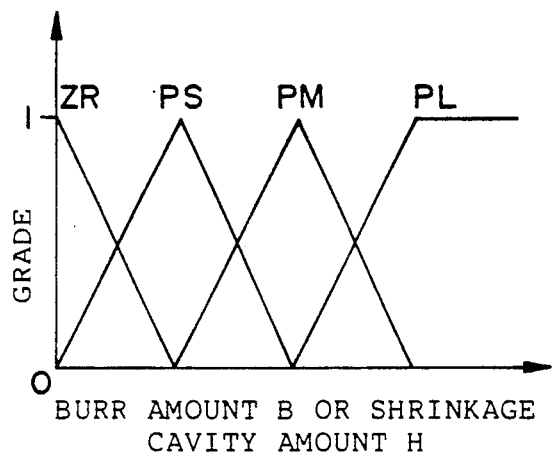
FIGS. 2a and 2b are graphs showing examples of membership functions which are used in a fuzzy inference apparatus.

FIG. 2a shows membership functions which are commonly used for the burr amount B and the shrinkage cavity amount H as input variables of the fuzzy inference apparatus 4. In the embodiment, four kinds of membership functions ZR to PL are used. ZR denotes almost zero, PS denotes positive small, PM denotes positive medium, and PL denotes positive large, respectively. ZR to PL are called labels of the membership functions here.

Figure 2B:
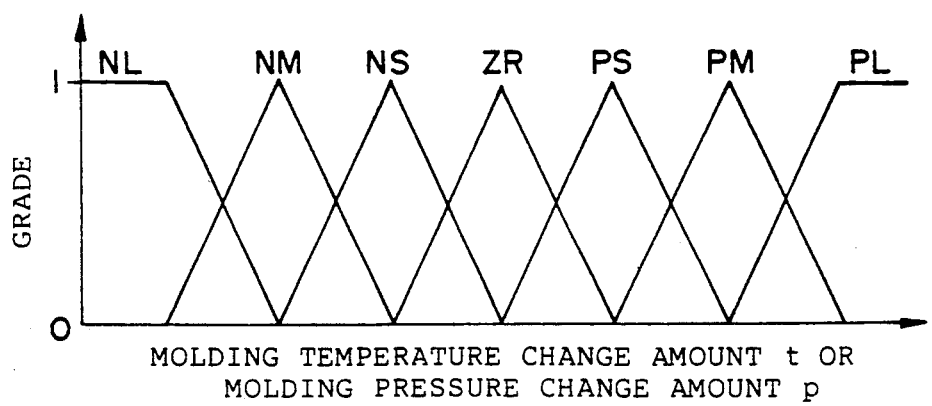

FIG. 2b shows membership functions which are commonly used for the molding temperature change amount data t and the molding pressure change amount data p as output variables. In the embodiment, membership functions of seven kinds of labels of NL to PL are used. NL denotes negative large, NM denotes negative medium, and NS denotes negative small, respectively. ZR, PS, PM, and PL have the same meanings as those mentioned above.

FIG. 3 shows an example of fuzzy rules to infer the molding temperature change amount data t and the molding pressure change amount data p.

The first rule
If B=PL, H=ZR, then t=NM, p=NL
substantially shows the following two rules.
If B=PL, H=ZR, then t=NM and
If B=PL, H=ZR, then p=NL.

In a manner similar to the above, each of the other rules can be separated into two rules relating to the molding temperature change amount t and the molding pressure change amount p, respectively.

B denotes the burr amount and H indicates the shrinkage cavity amount. B=PL, H=ZR, and the like are called antecedents and t=NM, p=NL, and the like are called consequents.

When the input value of the burr amount B and shrinkage cavity amount H are given, the fuzzy inference apparatus 4 obtains adaptations (membership function values) for the membership functions corresponding to the input values in the respective fuzzy rules. The smallest one of the adaptation values in the antecedents is calculated as an antecedent adaptation every fuzzy rule (MIN operation). Each of the membership function relating to the consequent of the corresponding fuzzy rule is truncated by the antecedent adaptation obtained in each rule as mentioned above (truncation, MIN operation), respectively. Further, all of the consequent membership functions of the fuzzy rules determined are superposed with respect to each of the molding temperature change amount and the molding pressure change amount (MAX operation). Positions of center of gravity in the superposed membership functions are determined as the molding temperature change amount data and the molding pressure change amount data.

In the above embodiment, the molding temperature change amount data and the molding pressure change amount data have been obtained by the fuzzy inferences. Alternatively, the optimum molding temperature and the optimum molding pressure may be also directly inferred. To adjust the molding temperature and the molding pressure, coefficients to be multiplied to them may be also fuzzy inferred.

Further, a molding time, a molding speed, and the like are also inferred in addition to the molding temperature and the molding pressure and the molding machine can be also controlled by those data.

Although the above embodiment has been constructed so as to respectively detect the burr amount by using the first sensor and to detect the shrinkage cavity amount by using the second sensor, it is also possible to judge a burr amount and a shrinkage cavity amount by the operator by using the eyes and the results of the judgments are supplied to the fuzzy inference apparatus 4 by using the inputting apparatus. In such a case, the burr amount and the shrinkage cavity amount may be also supplied by using numerical values or by using the labels of the foregoing membership functions.

What is claimed is:

1. A control apparatus of a molding machine, comprising:

means for inputting a burr amount and a shrinkage cavity amount of a molded article;

a fuzzy inference apparatus which executes a fuzzy inference operation using a membership function relating to the burr amount, a membership function relating to the shrinkage cavity amount, a membership function of a value relating to a molding temperature, a membership function of a value relating to a molding pressure, and rules using the burr amount and the shrinkage cavity amount as input variables and also using the value relating to the molding temperature and the value relating to the molding pressure as output variables, said fuzzy inference apparatus receiving the burr amount and the shrinkage cavity amount which have been inputted by the inputting means and executing a fuzzy inference using said rules and membership functions to generate a value relating to the molding temperature and a value relating to the molding pressure; and a molding machine which has its molding temperature and pressure adjusted in accordance with said generated values.

2. An apparatus according to claim 1, wherein said inputting means comprises a first sensor to detect the burr amount of the molded article and a second sensor to detect the shrinkage cavity amount of the molded article.

3. An apparatus according to claim 1, wherein said inputting means is used to input the value relating to the burr amount and the value relating to the shrinkage cavity amount by an operator entry.

4. A control apparatus of a molding machine, comprising:
   means for inputting a burr amount and a shrinkage cavity amount of a molded article;
   a fuzzy inference apparatus which executes a fuzzy inference operation using a membership function relating to the burr amount, a membership function relating to the shrinkage amount, at least one of a membership function relating to the function of a value relating to a molding temperature and a membership function of a value relating to a molding pressure, and rules using the burr amount and the shrinkage cavity amount as input variables and at least one of said value relating to a molding temperatures and said value relating to a molding pressure as an output variable, said fuzzy inference apparatus receiving the burr amount and the shrinkage cavity amount which have been inputted by the inputting means and executing a fuzzy inference using said rules and membership functions to generate said at least one of said value relating to the molding temperature and said value relating to the molding pressure; and
   a molding machine which has at least one of its molding pressure and a molding temperature adjusted in accordance with a corresponding said at least one generated value.

5. A method of controlling a molding machine, comprising the steps of:
   receiving a burr amount and a shrinkage cavity amount of a molded article which have been inputted;
   performing a fuzzy inference operation using (a) said inputted burr amount and shrinkage cavity amount; (b) a membership function relating to the burr amount, a membership function relating to the shrinkage cavity amount, at least one of a membership function of value relating to a molding temperature and a membership function of a value relating to a molding pressure, and (c) rules using a burr and a shrinkage cavity amount as input variables and also using at least one of said value relating to the molding temperature and said value relating to the molding pressure as output variables, said fuzzy inference operation generating at lest one of said value relating to the molding temperature and molding pressure; and
   adjusting at least one of the temperature and pressure of a molding machine in accordance with a corresponding said at least one generated value.

6. A method as in claim 5, wherein said fuzzy inference operation generates a value relating to molding temperature and a value relating to molding pressure and wherein said temperature and pressure of said molding machine are adjusted in accordance with said generated values.

* * * * *